US006985933B1

(12) United States Patent
Singhal et al.

(10) Patent No.: US 6,985,933 B1
(45) Date of Patent: Jan. 10, 2006

(54) METHOD AND SYSTEM FOR INCREASING EASE-OF-USE AND BANDWIDTH UTILIZATION IN WIRELESS DEVICES

(75) Inventors: Sandeep Kishan Singhal, Raleigh, NC (US); Edith Helen Stern, Boca Raton, FL (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 09/583,318

(22) Filed: May 30, 2000

(51) Int. Cl.
G06F 15/16 (2006.01)
G06F 15/173 (2006.01)

(52) U.S. Cl. .................. 709/219; 709/203; 709/217; 709/226

(58) Field of Classification Search ............... 709/203, 709/217, 218, 219, 227
See application file for complete search history.

(56) References Cited

U.S. PATENT DOCUMENTS

| | | | |
|---|---|---|---|
| 5,875,446 A | 2/1999 | Brown et al. ................ 707/3 |
| 5,991,735 A | 11/1999 | Gerace ...................... 705/10 |
| 5,999,929 A | 12/1999 | Goodman .................... 707/7 |
| 6,009,410 A | 12/1999 | LeMole et al. ............. 705/14 |
| 6,009,459 A * | 12/1999 | Belfiore et al. ............ 709/203 |
| 6,014,090 A * | 1/2000 | Rosen et al. |
| 6,047,327 A | 4/2000 | Tso et al. ................... 709/232 |
| 6,049,821 A | 4/2000 | Theriault et al. .......... 709/203 |
| 6,092,100 A * | 7/2000 | Berstis et al. .............. 709/227 |
| 6,101,472 A | 8/2000 | Giangarra et al. ......... 704/275 |
| 6,157,705 A * | 12/2000 | Perrone |
| 6,202,023 B1 | 3/2001 | Hancock et al. ........... 701/201 |
| 6,219,696 B1 * | 4/2001 | Wynblatt et al. .......... 709/218 |
| 6,247,048 B1 * | 6/2001 | Greer et al. ............... 709/219 |
| 6,282,511 B1 | 8/2001 | Mayer ....................... 704/270 |
| 6,338,082 B1 * | 1/2002 | Schneider .................. 709/203 |
| 6,351,467 B1 * | 2/2002 | Dillon ........................ 709/227 |
| 6,353,398 B1 | 3/2002 | Amin et al. ................ 340/995 |
| 6,353,839 B1 * | 3/2002 | King et al. |
| 6,363,419 B1 * | 3/2002 | Martin et al. .............. 709/219 |
| 6,519,646 B1 | 2/2003 | Gupta et al. ............... 709/229 |
| 6,522,875 B1 | 2/2003 | Dowling et al. ........... 455/414 |
| 6,526,439 B1 * | 2/2003 | Rossmann et al. ......... 709/219 |
| 6,546,002 B1 | 4/2003 | Kim .......................... 370/351 |
| 6,560,640 B2 | 5/2003 | Smethers .................... 709/219 |
| 6,564,254 B1 * | 5/2003 | Shoji et al. ................ 709/217 |
| 6,604,076 B1 | 8/2003 | Holley et al. ........... 704/270.1 |
| 6,610,105 B1 | 8/2003 | Martin, Jr. et al. ........ 715/513 |
| 6,618,726 B1 | 9/2003 | Colbath et al. .............. 707/6 |
| 6,631,496 B1 | 10/2003 | Li et al. ................... 715/501.1 |
| 6,654,813 B1 * | 11/2003 | Black et al. ............... 709/217 |

(Continued)

FOREIGN PATENT DOCUMENTS

WO WO 99/45732 9/1999

*Primary Examiner*—Rupal Dharia
*Assistant Examiner*—Quang N. Nguyen
(74) *Attorney, Agent, or Firm*—Sawyer Law Group LLP

(57) ABSTRACT

A method and system for increasing ease-of-use and bandwidth utilization in a wireless device capable of accessing a communication network is disclosed. The present invention uses the wireless device to send information about the environment to a server on the communication network. In response, the wireless device receives identifiers from the server of the web sites most likely to be requested by a user of the wireless device in that environment. In a further aspect of the present invention, the wireless device may also pre-fetch contents from the identified web sites in times when bandwidth is not in use to further speed responsiveness of the device.

64 Claims, 6 Drawing Sheets

U.S. PATENT DOCUMENTS 6,671,738 B1  12/2003  Rajchel et al. .............. 709/245
6,707,809 B1   3/2004  Warrier et al. ............. 370/351
6,708,206 B1   3/2004  Thrane et al. .............. 709/219
6,715,131 B2   3/2004  Martin, Jr. et al. ......... 715/526

* cited by examiner

Service Database Process

Wireless Device Process

Location A            Location B

METHOD AND SYSTEM FOR INCREASING EASE-OF-USE AND BANDWIDTH UTILIZATION IN WIRELESS DEVICES

CROSS-REFERENCE TO RELATED APPLICATIONS

The present invention is related to co-pending U.S. patent application Ser. No. 09/585,231 entitled "Method And System For Increasing Ease-Of-Use And Bandwidth Utilization In A Wireless Device," which is assigned to the assignee of the present application and filed on the same date as the present application.

FIELD OF THE INVENTION

The present invention relates to a method and system for increasing ease-of-use and bandwidth utilization in a wireless device, and more particularly, to a method and system for providing an environment-sensitive user interface for such devices.

BACKGROUND

The Internet and Internet access are experiencing phenomenal growth with more and more people taking advantage through personal computers, and more recently, network computers. This growth is about to take a giant leap forward with the explosion of portable devices capable of wireless data communication, including communication to the Internet. Examples of portable wireless devices include PDAs and cellphones.

User friendliness is of key importance in the acceptance of such devices; more so than for personal computers (PCs). When a new generation of PCs is made available, users of the new PCs are generally veteran, sophisticated users of the previous generations of PCs. With portable wireless devices, it is expected that the previous experience of users will be more in the nature of cellphone experience. That is, users of these devices may be inexperienced and unsophisticated data communicators. Therefore, ease-of-use will be a distinct differentiator in the marketplace for wireless Internet-enabled devices.

There are many trade-offs required to use wireless devices. The small size of the device means a small screen and keyboard, or touchscreens, if any, with corresponding difficulties in data entry. Consequently, entering uniform resource locators (URLs) into the wireless device can be cumbersome and tedious to the user. Furthermore, the bandwidth of data communications is also limited, meaning that it may take significant amounts of time to receive web data from the URLs.

Accordingly, what is needed is an improved method and system for increasing ease-of-use and bandwidth utilization in a wireless Internet-enabled device. The present invention addresses such a need.

SUMMARY

The present invention provides a method and system for increasing ease-of-use and bandwidth utilization in a wireless device capable of accessing a communication network. The present invention uses the wireless device to send information about the environment to a server on the communication network. In response, the wireless device receives identifiers from the server of the web sites most likely to be requested by a user of the wireless device in that environment. The wireless device then caches the identifiers for selection by the user. In a further aspect of the present invention, the wireless device may also pre-fetch contents from the identified web sites in times when bandwidth is not in use to further speed responsiveness of the device.

According to the present invention, web site identifiers, such as URLs, are automatically downloaded and cached on portable wireless devices, and then presented to the user based on environment and presumed interest, thereby providing an environment-sensitive user interface that is both easy to use and increases bandwidth utilization.

DETAILED DESCRIPTION

The present invention relates to increasing ease-of-use and bandwidth utilization in a portable wireless device using data mining and an environment-sensitive user interface. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
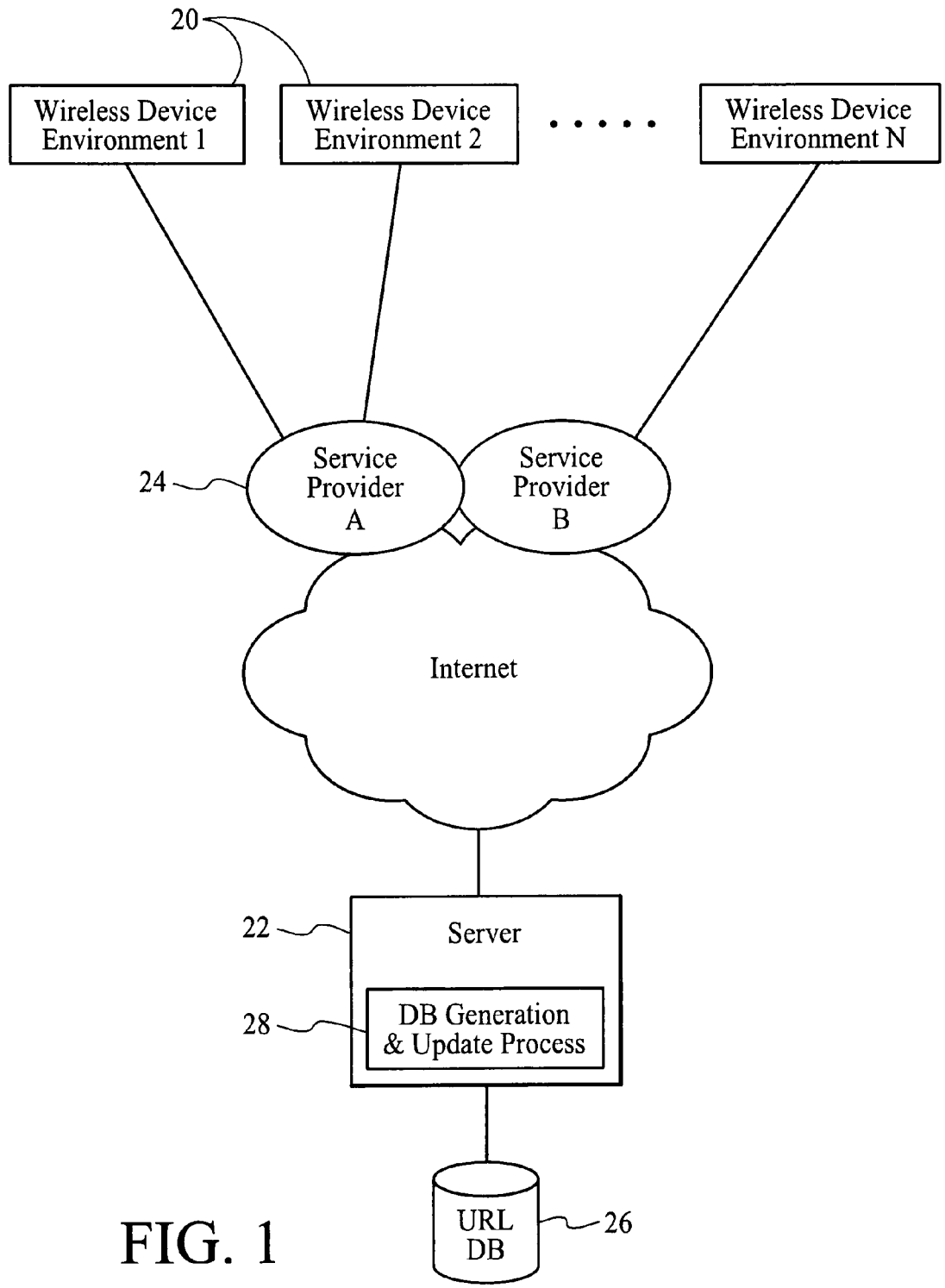
FIG. 1 is a diagram illustrating a system environment in which the present invention resides.

FIG. 1 is a diagram illustrating a system environment in which the present invention resides. In a preferred embodiment, one or more portable wireless devices 20 in various environments are in communication with a server 22 over the Internet. Each of the wireless devices 20 is connected to the Internet via a service provider 24, which may comprise a wireless carrier and/or an internet service provider (ISP) that is capable of servicing many wireless devices 20 simultaneously. In a preferred embodiment, the server 22 maintains a database 26 of web site identifiers that are categorized by environmental factors such that when the database is queried with the information about the current environment of a wireless device 20, the database 26 returns a set of identifiers to the device 20 anticipated to be most likely accessed by users in that environment. In a preferred embodiment, environmental factors include items such as location of access, local weather, time and date, or any combination thereof. These could be further modified by user preferences. In a preferred embodiment, the identifiers of the web sites stored in the database 26 represent URLs.

The URL database 26 is maintained through a database 26 generation and update process 28.

Although the present invention is explained in terms of the wireless devices 20 being in wireless communication with the Internet through a service provider 24, it should be understood that the present invention may also be used where portable devices are connected to any type of communication network, such as intranets, and where the portable devices are physically connected to the network. In addition, although in a preferred embodiment the server 22 is maintained by one of the service providers 24, the server 22 may also be maintained by an independent service that offers location sensitive services to the service provider 24 for a fee.

In an alternate embodiment within service providers 24 there may be a cache copy of the environment database 26, maintained by server 22. Interactions with wireless devices 20 are then serviced by the caches within service providers 24. These caches may be maintained by the service provider 24; they may be maintained by the service maintaining database 26 associated with server 22 or they may be maintained by a third party caching service on behalf of the service maintaining the server 22, the service providers 24 or some additional party.

Figure 2:
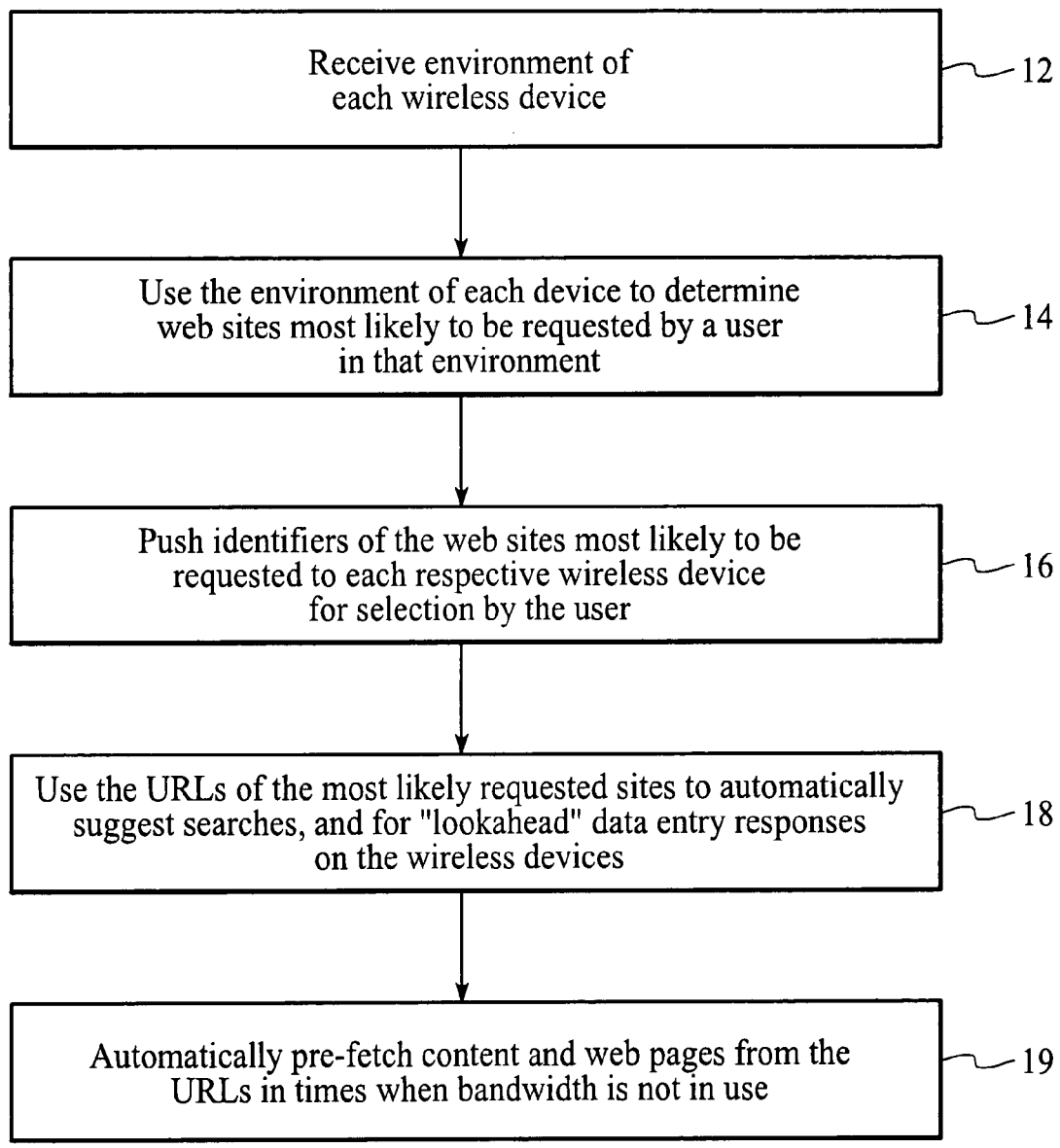
FIG. 2 is a flow chart illustrating the process of increasing ease-of-use and bandwidth utilization in a wireless device capable of accessing the Internet in accordance with the present invention.

FIG. 2 is a flow chart illustrating the process of increasing ease-of-use and bandwidth utilization in a wireless device 20 capable of accessing the Internet in accordance with the present invention. The process begins by receiving information about the environment of each of the wireless devices 20 in step 12, where the environment information includes any combination of geographic location, time and date, local weather and so on. The environment information of each device 20 and optional other information are then used to determine web sites most likely to be requested by a user in that environment in step 14. The server 22 then automatically pushes identifiers (preferably URLs) of the web sites most likely to be requested to each respective wireless device 20 for selection by the user in step 16. The URLs of the most likely requested sites may then be used to automatically suggest searches, and for "lookahead" data entry responses on the wireless devices 20 in step 18. The wireless devices 20 may also automatically pre-fetch content and web pages from the URLs in times when bandwidth is not in use to further speed responsiveness of the devices 20 in step 19.

The following scenario illustrates the problem encountered by a user of a wireless device 20, such as a web-enabled cellphone (web phone), and the advantage conferred by the present invention when geographic location is used as the environmental factor. In this scenario, a family is shopping for a car and is carrying a web phone. As the family walks the car lot, they would like to use the web phone to access web sites for safety information, consumer reports on different car models, and perhaps a Better Business Bureau report on any complaints about this particular merchant. The family may not know that the Better Business Bureau report exists, but once apprised of its existence, the family will access it. Assume further that the family may never have accessed any of these web sites before.

With the present invention, the scenario continues as follows. The location of the web phone is identified through one of several means and relayed to the ISP or portal serving the user. In a preferred embodiment of the present invention, the location of the web phone may be established by a GPS chip in the phone, which will report the location to the phone so that the phone may relay the location to the server 22. In a second embodiment, the location of the phone may be determined via a user data entry of a street address. In a third embodiment, the location of the phone is determined by the wireless carrier that identifies which cell the web phone is operating, or using other 911-like means of location identification, and passing the information to the server 22. In a fourth embodiment, the communication method is a narrow range wireless method, such as bluetooth, and location knowledge is implicit in the cell or picocell which has made contact with the cellphone. For example, data regarding the web sites may be served by a server at the car lot. This fourth embodiment may be a less favorable method of distribution to the user because a biased view of the data or set of links may be presented. In a fifth embodiment, local cells are equipped with a GPS device, and location information is transmitted to the wireless devices, which then pass on the location to the server 22.

After the server 22 receives the location of the web phone, the server 22 uses the location to query past history of data access from that location to determine the most popular web sites or other content accessed. That is, the server 22 finds the most frequently accessed sites from the car lot. In a preferred embodiment of the present invention, the server 22 pushes the URLs or other identifiers of the top web sites to the web phone. Additionally, for some web sites, the server 22 may push the data from the sites (with appropriate transcoding) to the web phone, or the web phone may pre-fetch URLs on the assumption that they are likely to be requested by the user. When the family decides to access content, the web phone may or may not indicate what has been pre-fetched. If the family begins to enter a request, the web phone uses the URLs for "lookahead" data entry to suggest the most likely site, or search argument. In a alternative embodiment, the wireless device 20 presents the URL's as a menu to the users for selection.

Figure 3:
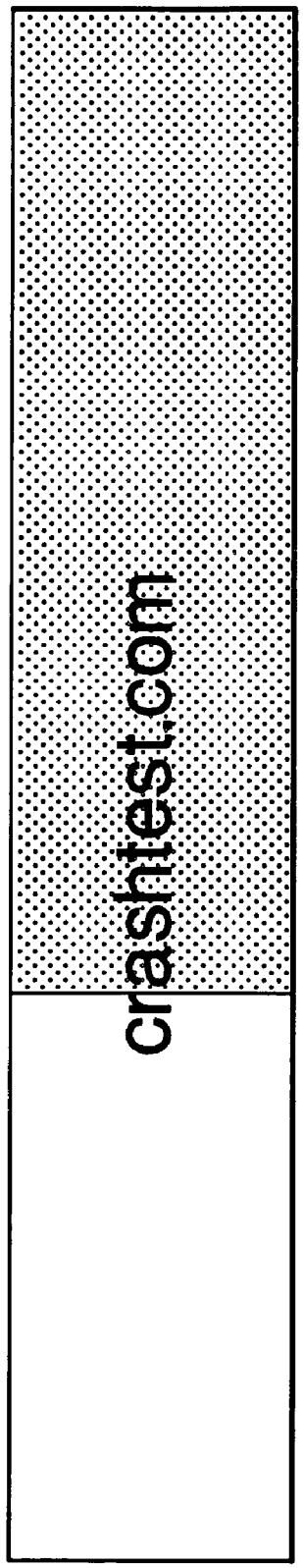
FIG. 3 is a diagram of an entry window on a wireless device illustrating lookahead data entry.

FIG. 3 is a diagram of an entry window on a wireless device 20 illustrating lookahead data entry. In this example, the user has started to type the word "crash". Assuming that one of the cached URLs is "http://www.crashtest.com", then in response to the user entering "cr", the wireless device 20 automatically suggests the crashtest.com web site. If this is a site that interests the user, then the user may hit the equivalent of "enter" to make the request. If the user were to type another letter, the device 20 would try to suggest another site. Typeahead features are common with Web browsers in which suggestions for web sites are based on previous requests from the user. According to the lookahead feature of the present invention, however, the suggestions made may have never before been entered by the user and may have no long-term interest to the user, but are available based on location and presumed interest.

As a further example, assume that in the above scenario, local weather is used as the environmental factor, and that it begins to rain on the family at the car lot. In this case, the database 26 may return URLs to the family's web phone about local places to buy umbrellas, for instance.

In a second preferred embodiment of the invention, a location specific welcome page (LSWP) is prepared and periodically sent to the wireless device 20. The LSWP is a visual representation of the URL's determined by the database to be revelant to the specific location. The LSWP may be sent by the server 22, the service provider 24, or a third party. The LSWP may include icons representing the anticipated most valued sites, and may also include personalization based on user demographics or profile. In the scenario above, the LSWP would display icons for consumer reports on cars, crash tests, and so on. To acquire the desired information, the user would simply touch one of the icons, rather than typing in a URL. While this page may be pre-cached on the wireless device 20, such a scheme allows an incorrect LSWP to be displayed should the user change location into a non-accessible spot. The preferred embodiment, therefore, is for the LSWP to be sent on demand, rather than having it pre-cached. When demanded, the LSWP may either be pre-existing or dynamically created with the appropriate data and icons.

Figure 4:
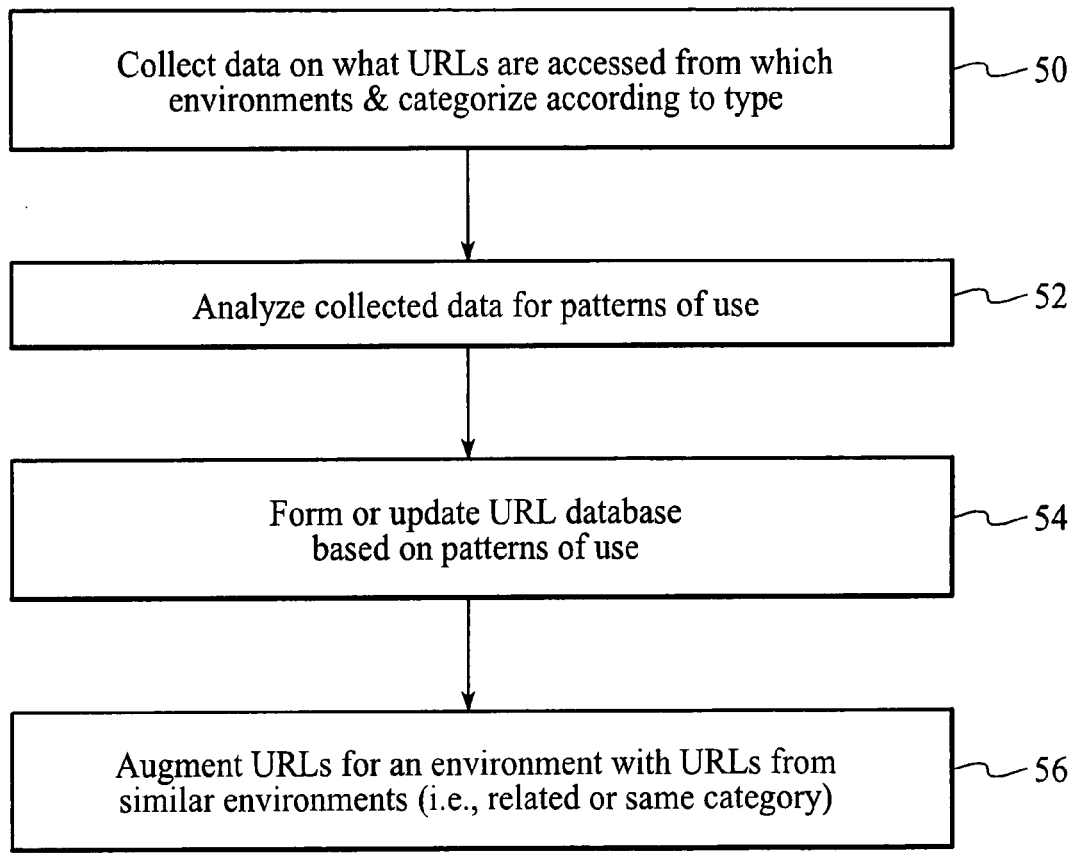
FIG. 4 is a flow chart illustrating the database generation and update process implemented by the server in accordance with the present invention.

FIG. 4 is a flow chart illustrating the database generation and update process 28 implemented on the server 22 in accordance with the present invention. The process begins by collecting information from the service provider 24 indicating which URLs are accessed in what environments by the wireless devices 20, and categorizing the URLs according to type of environment in step 50. Where geographic location is collected, for example, the size and the type of the locations may be defined specifically or generally. For example, the size of the location may be defined as a five-mile or one-half mile area. The type of location, such as a car lot, may be categorized as "Ford new cars", "cars", or "trucks".

After categorizing the URLs, the server 22 analyzes the data collected for each environment for patterns of use in step 52. In a preferred embodiment, the URLs most widely accessed in any given environment are assigned a higher priority. Access patterns are also analyzed according to other factors, such as time (e.g., day the week) and weather. In addition, patterns of use in similar environments may also be used for the current environment. The pattern of use analysis can be performed real-time and ongoing, or can be non real-time.

The patterns of use and server policies are then used to form a URL database 26 in step 54. The patterns of use and server policies are also used to update and query the URL database 26. When queried with information about a particular environment, the database 26 fetches a set of URLs most likely to be accessed by a user in that environment for opportunistic caching at a particular wireless device 20. Server policies will define how many sites to recognize, advertising contracts, which sites to present iconically (e.g., top five, best five with advertising, etc.), which URLs to cache at the device 20, and so on. URLs from associated category sites may optionally be added.

Figure 5:
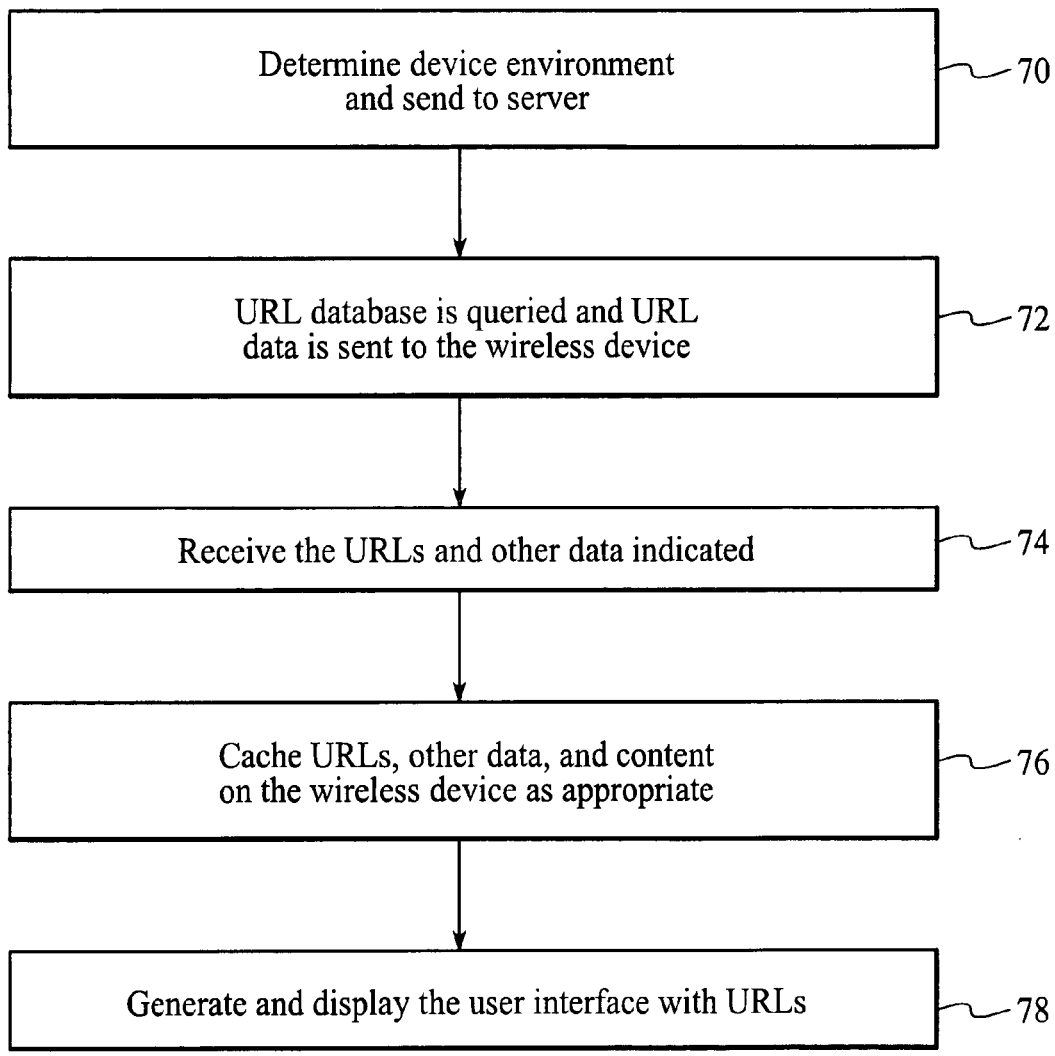
FIG. 5 is a flow chart of caching URLs on a wireless device in accordance with the present invention.

FIG. 5 is a flow chart of caching URLs on a wireless device 20 in accordance with the present invention. The wireless device 20 first determines information about its environment, such as geographic location, and sends the data to the server 22 providing the environment services in step 70. In a preferred embodiment, the device 20 determines the environment periodically. The environment may be determined on demand, however, some of the advantages provided by the invention to even-out bandwidth utilization could be lost. As described above, the environment factors can be obtained automatically through one of several methods, including GPS, or manually through user entry. In a preferred embodiment, the wireless device 20 determines the environment, rather than having the environment determined by the service provider 24.

The environment data is then used by the server 22 to query the URL database 26, and results are sent back to the device 20 in step 72. The result may include URLs, URL keywords, URL icons with identifying text, speech annotations, and content from a limited number of sources, such as web sites. To produce results tailored to the user, the query may also have included personalization information about the requesting user. The personalization information may include data on device capability, user profile, demographics, and so on.

The wireless device 20 receives the URL results in step 74, and caches the URL results for selection by the user in step 76. Optionally, the wireless device 20 may inform the user that results have been received. The notification may be audible (such as an alarm), may be visible (such as a data-waiting light), or may be tactile (such as the non-audio vibrations that pagers employ for silent notification). In one preferred embodiment, the device 20 generates and then displays a list of the URLs in the environment sensitive user interface in step 78.

Figure 6:
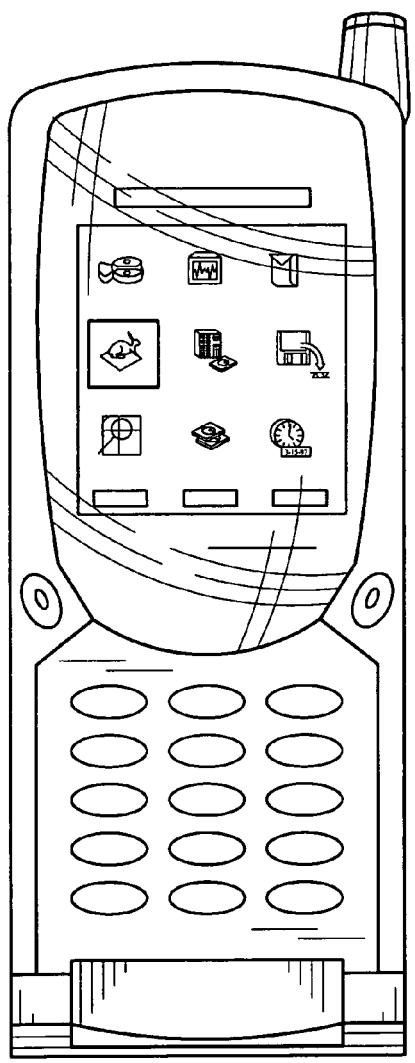
FIG. 6 is a block diagram showing an example web phone displaying the location sensitive user interface of the present invention at two different locations.
Figure 6:
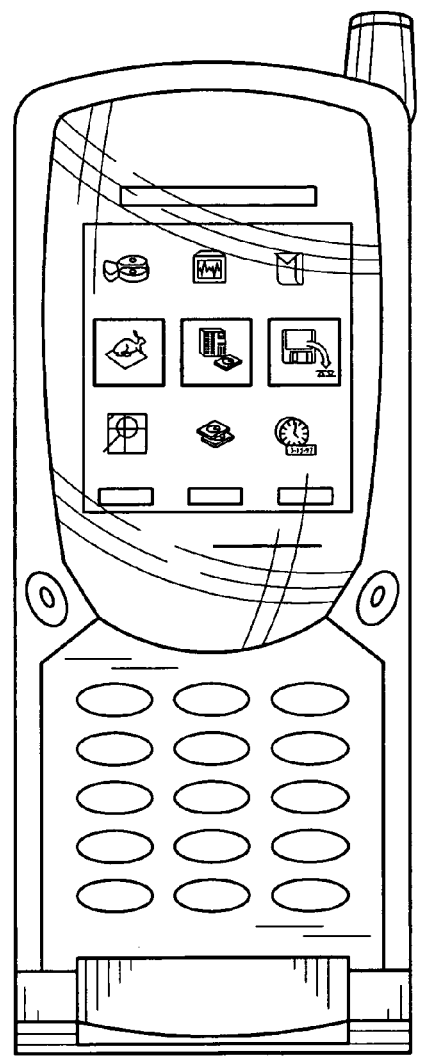

FIG. 6 is a block diagram showing an example web phone displaying the environment sensitive user interface of the present invention at two different locations. At location A, one set of URL icons is displayed based on presumed interest, while at location B, a different set of URL icons is displayed, again based on presumed interest, but with no user interaction required.

The user friendliness of the service provided by the present invention can be augmented by combining the present invention with UI's other than touch screen or keyboard. In another embodiment of the present invention, in addition to the URLs, associated keyword URLs (kURLs) are also cached at the wireless device 20. In this embodiment, knowledge of the location allows the service provider 24 to prep the device 20 with many locally significant keywords in devices 20 that allows a measure of speech recognition. When the user speaks a request, such as "car safety records", the request is recognized and matched against the limited vocabulary based on the kURLs cached at the wireless device 20. More specifically, when the user speaks a word or phrase, the wireless device recognizes the words, performs a keyword match on the kURLs, and then displays iconic choices best matching the spoken request for one touch access.

A method and system for increasing ease-of-use and bandwidth utilization in a wireless device has been disclosed in which URLs are datamined on a server, sent to the device, cached, and then presented to the user through an environment sensitive user interface. The present invention has been described in accordance with the embodiments shown, and one of ordinary skill in the art will readily recognize that there could be variations to the embodiments, and any variations are within the spirit and scope of the present invention. For example, it should be understood that the functions provided by the present invention may be implemented in software that is resident on computer-readable mediums in different locations within the network, such as in the server, the wireless devices, and/or other locations and devices. Accordingly, many modifications may be made by one of ordinary skill in the art without departing from the spirit and scope of the appended claims.

What is claimed is:

1. A method for increasing ease-of-use and bandwidth utilization in a wireless device capable of accessing a communication network, comprising the steps of:

(a) sending environment information describing the environment of the wireless device to a server on the communication network, wherein the environment information includes geographical location, local weather, time and date, and any combination thereof, wherein the server maintains a database of web site identifiers that are categorized by environmental factors, and queries the database using the environment information to determine particular web sites most likely to be requested by a user of the wireless device in that the environment of the wireless device, wherein the particular web sites are determined by examining prior patterns of access of web sites in the environment of the wireless device by users of the communication network;

(b) receiving identifiers from the server of the particular web sites most likely to be requested by the user of the wireless device in that environment, wherein server policies determine which particular web site identifiers are received by the device; and (c) caching the identifiers for selection by the user.

2. The method of claim 1 further including the step of receiving a personalization of the received identifiers based on personalization information.

3. The method of claim 1 further including the step of pre-fetching content from at least one of the web sites indicated by the identifiers.

4. The method of claim 1 further including the step of informing the user that the identifiers have been received.

5. The method of claim 1 further including the step of displaying the identifiers on the wireless device for selection by the user.

6. The method of claim 1 further including the step of periodically sending the geographic location to the server.

7. The method of claim 1 further including the step of receiving URLs as the identifiers.

8. The method of claim 1 further including the step of receiving URL keywords as the identifiers for speech recognition.

9. The method of claim 1 further comprising using the cached identifiers for lookahead data entry when the user enters a request for information to the wireless device, wherein the user is not required to have previously entered the identifiers.

10. The method of claim 1 wherein the web site identifiers of the database are categorized according to types of environments.

11. The method of claim 1 wherein the web site identifiers received by the wireless devices are augmented with identifiers for web sites accessed from an environment similar to the the environment of the wireless device.

12. The method of claim 1 wherein the web site identifiers most likely to be requested are for web sites which have been most frequently requested by the users accessing the communication network when located in the current environment of the wireless device.

13. The method of claim 10 wherein the server categorizes the web site identifiers in types of environments by collecting information from a service provider of the communications network, the server analyzing the collected information for each environment for patterns of use by the users accessing the communications network, wherein the information indicates which web sites have been accessed from which environments by a plurality of wireless devices of the communications network.

14. A system for increasing ease-of-use and bandwidth utilization in a wireless device capable of accessing a communication network, comprising:

means for sending environment information describing the environment of the wireless device to a server on the communication network, wherein the environment information includes geographical location, local weather, time and date, and any combination thereof, wherein the server maintains a database of web site identifiers that are categorized by environmental factors, and queries the database using the environment information to determine particular web sites most likely to be requested by a user of the wireless device in the environment of the wireless device, wherein the particular web sites are determined by examining prior patterns of access of web sites in the environment of the wireless device by users of the communication network;

means for receiving identifiers from the server of the particular web sites most likely to be requested by the user of the wireless device in that environment, wherein server policies determine which particular web site identifiers are received by the device; and means for caching the identifiers for selection by the user.

15. The system of claim 14 wherein the environment information comprises time and date.

16. The system of claim 14 further including means for receiving a personalization of the received identifiers based on personalization information.

17. The system of claim 14 further including means for pre-fetching content from at least one of the web sites indicated by the identifiers.

18. The system of claim 14 further including means for informing the user that the identifiers have been received.

19. The system of claim 14 wherein the identifiers are displayed on the wireless device for selection by the user.

20. The system of claim 14 further including means for periodically sending the geographic location to the server.

21. The system of claim 14 wherein the URLs are received as the identifiers.

22. The system of claim 14 wherein URL keywords are received as the identifiers for speech recognition.

23. The system of claim 14 further comprising means for using the cached identifiers for lookahead data entry when the user enters a request for information to the wireless device, wherein the user is not required to have previously entered the identifiers.

24. The system of claim 14 wherein the web site identifiers most likely to be requested are for web sites which have been most frequently requested by the users accessing the communication network when located in the current environment of the wireless device.

25. The system of claim 14 wherein the server categorizes web site identifiers of the database according to types of environments by collecting information from a service provider of the communications network, the server analyzing the collected information for each environment for patterns of use by the users accessing the communications network, wherein the information indicates which web sites have been accessed from which environments by a plurality of wireless devices of the communications network.

26. A computer-readable medium containing program instructions for increasing ease-of-use and bandwidth utilization in a wireless device capable of accessing a communication network, the instructions for:

a. sending environment information describing the environment of the wireless device to a server on the communication network, wherein the environment information includes geographical location, local weather, time and date, and any combination thereof, wherein the server maintains a database of web site identifiers that are categorized by environmental factors, and queries the database using the environment information to determine particular web sites most likely to be requested by a user of the wireless device in the environment of the wireless device, wherein the particular web sites are determined by examining prior patterns of access of web sites in the environment of the wireless device by users of the communication network;

b. receiving identifiers from the server of the particular web sites most likely to be requested by the user of the wireless device in that environment, wherein server policies determine which particular web site identifiers are received by the device; and caching the identifiers for selection by the user.

27. The computer-readable medium of claim 26 further including the instruction of receiving a personalization of the received identifiers based on personalization information.

28. The computer-readable medium of claim 26 further including the instruction of pre-fetching content from at least one of the web sites indicated by the identifiers.

29. The computer-readable medium of claim 26 further including the instruction of informing the user that the identifiers have been received.

30. The computer-readable medium of claim 26 further including the instruction of displaying the identifiers on the wireless device for selection by the user.

31. The computer-readable medium of claim 26 further including the instruction of periodically sending the geographic location to the server.

32. The computer-readable medium of claim 26 further including the instruction of receiving URLs as the identifiers.

33. The computer-readable medium of claim 26 further including the instruction of receiving URL keywords as the identifiers for speech recognition.

34. The computer-readable medium of claim 26 further comprising using the cached identifiers for lookahead data entry when the user enters a request for information to the wireless device, wherein the user is not required to have previously entered the identifiers.

35. The computer-readable medium of claim 26 wherein the web site identifiers received by the wireless devices are augmented with identifiers for web sites accessed from an environment similar to the the environment of the wireless device.

36. The computer-readable medium of claim 26 wherein the web site identifiers most likely to be requested are for web sites which have been most frequently requested by the users accessing the communication network when located in the current environment of the wireless device.

37. The computer-readable medium of claim 26 wherein the server categorizes web site identifiers of the database according to types of environments by collecting information from a service provider of the communications network, the server analyzing the collected information for each environment for patterns of use by the users accessing the communications network, wherein the information indicates which web sites have been accessed from which environments by a plurality of wireless devices of the communications network.

38. A method for increasing ease-of-use and bandwidth utilization in a wireless device capable of accessing a communication network, comprising the steps of:

a. sending a geographic location, local weather, time and date, and any combination thereof of the wireless device to a server on the communication network, wherein the server maintains a database of web site identifiers that are categorized by types of environments from which the identifiers are accessed by users of the communication network, and queries the database using the environment information to determine particular web sites most likely to be requested by a user of the wireless device in the environment of the wireless device, wherein the particular web sites are determined by examining prior patterns of access of web sites in the environment of the wireless device by users of the communication network;

b. receiving identifiers from the server of the particular web sites most likely to be requested by the user of the wireless device in that environment, wherein server policies determine which particular web site identifiers are received by the device; and c. caching the identifiers for selection by the user.

39. The method of claim 38 further including the step of pre-fetching content from at least one of the web sites indicated by the identifiers.

40. The method of claim 38 further including the step of informing the user that the identifiers have been received.

41. The method of claim 38 further including the step of displaying the identifiers on the wireless device for selection by the user.

42. The method of claim 38 further including the step of periodically sending the geographic location to the server.

43. The method of claim 38 further including the step of receiving URLs as the identifiers.

44. The method of claim 38 further including the step of receiving URL keywords as the identifiers for speech recognition.

45. The method of claim 38 further comprising using the cached identifiers for lookahead data entry when the user enters a request for information to the wireless device, wherein the user is not required to have previously entered the identifiers.

46. The method of claim 38 wherein the server categorizes web site identifiers of the database according to types of environments by collecting information from a service provider of the communications network, the server analyzing the collected information for each environment for patterns of use by the users accessing the communications network, wherein the information indicates which web sites have been accessed from which environments by a plurality of wireless devices of the communications network.

47. A system for increasing ease-of-use and bandwidth utilization in a wireless device capable of accessing a communication network, comprising:

means for sending a geographic location, local weather, time and date, and any combination thereof of the wireless device to a server on the communication network, wherein the server maintains a database of web site identifiers that are categorized by types of environments from which the identifiers are accessed by users of the communication network, and queries the database using the environment information to determine particular web sites most likely to be requested by a user of the wireless device in the environment of the wireless device, wherein the particular web sites are determined by examining prior patterns of access of web sites in the environment of the wireless device by users of the communication network;

means for receiving identifiers from the server of the particular web sites most likely to be requested by the user of the wireless device in that environment, wherein server policies determine which particular web site identifiers are received by the device; and means for caching the identifiers for selection by the user.

48. The system of claim 47 further including means for pre-fetching content from at least one of the web sites indicated by the identifiers.

49. The system of claim 47 further including means for informing the user that the identifiers have been received.

50. The system of claim 47 wherein the identifiers are displayed on the wireless device for selection by the user.

51. The system of claim 47 further including means for periodically sending the geographic location to the server.

52. The system of claim 47 wherein the URLs are received as the identifiers.

53. The system of claim 47 wherein URL keywords are received as the identifiers for speech recognition.

54. The system of claim 47 further comprising means for using the cached identifiers for lookahead data entry when the user enters a request for information to the wireless device, wherein the user is not required to have previously entered the identifiers.

55. The system of claim 47 wherein the server categorizes web site identifiers of the database according to types of environments by collecting information from a service provider of the communications network, the server analyzing the collected information for each environment for patterns of use by the users accessing the communications network, wherein the information indicates which web sites have been accessed from which environments by a plurality of wireless devices of the communications network.

56. A computer-readable medium containing program instructions for increasing ease-of-use and bandwidth utilization in a wireless device capable of accessing a communication network, the instructions for:
   a. sending a geographic location, local weather, time and date, and any combination thereof of the wireless device to a server on the communication network, wherein the server maintains a database of web site identifiers that are categorized by types of environments from which the identifiers are accessed by users of the communication network, and queries the database using the environment information to determine particular web sites most likely to be requested by a user of the wireless device in the environment of the wireless device, wherein the particular web sites are determined by examining prior patterns of access of web sites in the environment of the wireless device by users of the communication network;
   b. receiving identifiers from the server of the particular web sites most likely to be requested by the user of the wireless device in that environment, wherein server policies determine which particular web site identifiers are received by the device; and
   c. caching the identifiers for selection by the user.

57. The computer-readable medium of claim 56 further including the instruction of pre-fetching content from at least one of the web sites indicated by the identifiers.

58. The computer-readable medium of claim 56 further including the instruction of informing the user that the identifiers have been received.

59. The computer-readable medium of claim 56 further including the instruction of displaying the identifiers on the wireless device for selection by the user.

60. The computer-readable medium of claim 56 further including the instruction of periodically sending the geographic location to the server.

61. The computer-readable medium of claim 56 further including the instruction of receiving URLs as the identifiers.

62. The computer-readable medium of claim 56 further including the instruction of receiving URL keywords as the identifiers for speech recognition.

63. The computer-readable medium of claim 56 further comprising using the cached identifiers for lookahead data entry when the user enters a request for information to the wireless device, wherein the user is not required to have previously entered the identifiers.

64. The computer-readable medium of claim 56 wherein the server categorizes web site identifiers of the database according to types of environments by collecting information from a service provider of the communications network, the server analyzing the collected information for each environment for patterns of use by the users accessing the communications network, wherein the information indicates which web sites have been accessed from which environments by a plurality of wireless devices of the communications network.

* * * * *

UNITED STATES PATENT AND TRADEMARK OFFICE
CERTIFICATE OF CORRECTION

PATENT NO. : 6,985,933 B1
DATED : January 10, 2006
INVENTOR(S) : Singhal et al.

It is certified that error appears in the above-identified patent and that said Letters Patent is hereby corrected as shown below:

Column 7,
Line 2, delete "that" after "in" and before "the".
Line 42, delete "the" after "the" and before "environment".

Column 9,
Line 40, delete "the" after "the" and before "environment".

Signed and Sealed this

Eleventh Day of April, 2006

JON W. DUDAS
*Director of the United States Patent and Trademark Office*